United States Patent [19]

Briffod et al.

[11] Patent Number: 4,652,717
[45] Date of Patent: Mar. 24, 1987

[54] SELECTIVE POWER SUPPLY FOR TRAVELLING WIRE EDM APPARATUS

[75] Inventors: Jean P. Briffod, Lucinges; Roland Martin, Dingy-en-Vuache, both of France

[73] Assignee: Charmilles Technologies S.A., Geneva, Switzerland

[21] Appl. No.: 787,982

[22] Filed: Oct. 16, 1985

[30] Foreign Application Priority Data

Oct. 17, 1984 [CH] Switzerland ............... 4997/84

[51] Int. Cl.⁴ ............... B23H 1/02; B23H 7/04
[52] U.S. Cl. ............... 219/69 W; 219/69 M
[58] Field of Search ............... 219/69 W, 69 M, 69 C

[56] References Cited

U.S. PATENT DOCUMENTS

| 4,329,558 | 5/1982 | Martin | 219/69 W |
| 4,559,432 | 12/1985 | Itoh | 219/69 W |
| 4,575,605 | 3/1986 | Martin | 219/69 W |

FOREIGN PATENT DOCUMENTS

| 2502288 | 8/1976 | Fed. Rep. of Germany | 219/69 W |
| 52-58195 | 5/1977 | Japan | 219/69 W |
| 57-46974 | 10/1982 | Japan . | |
| 59-47123A | 3/1984 | Japan . | |

OTHER PUBLICATIONS

Inoue, English translation of Japan Patent Document 53-64899, published 09/1978.

Primary Examiner—A. D. Pellinen
Assistant Examiner—Geoffrey S. Evans
Attorney, Agent, or Firm—Hauke and Patalidis

[57] ABSTRACT

In a travelling wire EDM apparatus the thermal stresses of the electrode wire are substantially reduced by detecting the position of the triggering electrical discharges preceding the machining electrical discharges, and by controlling the supply of the machining electrical discharge current at one end of the machining zone, at the other end of the machining zone or at both ends of the machining zone. When a machining electrical discharge is located between one end of the machining zone and a first reference position, the machining current is applied at that end. When the electrical discharge is located between the other end of the machining zone and a second reference position, machining current is supplied at that second end. When the electrical discharge is located between the two reference positions, the machining current is applied simultaneously at both ends of the machining zone.

10 Claims, 8 Drawing Figures

SELECTIVE POWER SUPPLY FOR TRAVELLING WIRE EDM APPARATUS

BACKGROUND OF THE INVENTION

In travelling wire EDM apparatus wherein a workpiece is cut by machining electrical discharges by means of an electrode wire, the cutting speed is limited by the thermal stresses exerted on the wire in the course of machining. The stresses are due on one hand to the heat produced by each electrical discharge and on the other hand to the ohmic losses of the machining current flowing along the wire. An important portion of the heat produced during machining is evacuated by the machining fluid injected between the wire and the workpiece in the machining zone; however there is a limit to the amount of heat that the machining fluid can handle. The only source of heat on which it is possible to act in order to increase the machining speed is the heat due to ohmic losses, or Joule effect.

It is conventional to supply the machining current to the electrode wire via two contacts, one located on one side and the other on the other side of the machining zone. The power dissipated as heat depends from the position where an electrical discharge occurs along the machining zone, the power being minimum when the electrical discharge occurs at one end of the machining zone and maximum when the electrical discharge appears at the middle of the machine zone. However, when an electrical discharge is produced proximate one end of the machining zone, the portion of machining current flowing from the other contact through the length of electrode wire in the machining zone simply produces a useless heating of the wire.

In Japanese Patent publication No. A59-47 123 there is disclosed an arrangement for supplying the machining current at one or the other of the ends of the machining zone at a frequency lower than that of the machining pulses. This enables a relative cooling of each of the halves of the machining zone to take place during the half period during which current is brought through the other end of the machining zone, but the total thermal losses are reduced only by a fraction.

SUMMARY OF THE INVENTION

The present invention has for principal object to decrease the losses due to parasitical heat being generated in a workpiece cutting operation in a travelling wire EDM apparatus. The present invention thus permits to prevent excessive localized heating of the electrode wire to take place due to concentration of faulty electrical discharges at any given location along the wire. The invention permits to select the end of the electrode wire at which machining current is supplied as a function of the position of each electrical discharge, such as to decrease heating of the wire due to the resistance of the wire, more particularly in the central portion of the machining zone where the wire is subjected to substantially ineffective cooling.

The many objects and advantages of the present invention will become apparent to those skilled in the art when the following description of the best modes contemplated for practicing the invention is read in conjunction with the accompanying drawing wherein like reference numerals refer to like or equivalent parts, and in which:

DETAILED DESCRIPTION OF THE PREFERRED EMBODIMENTS

Figure 1:
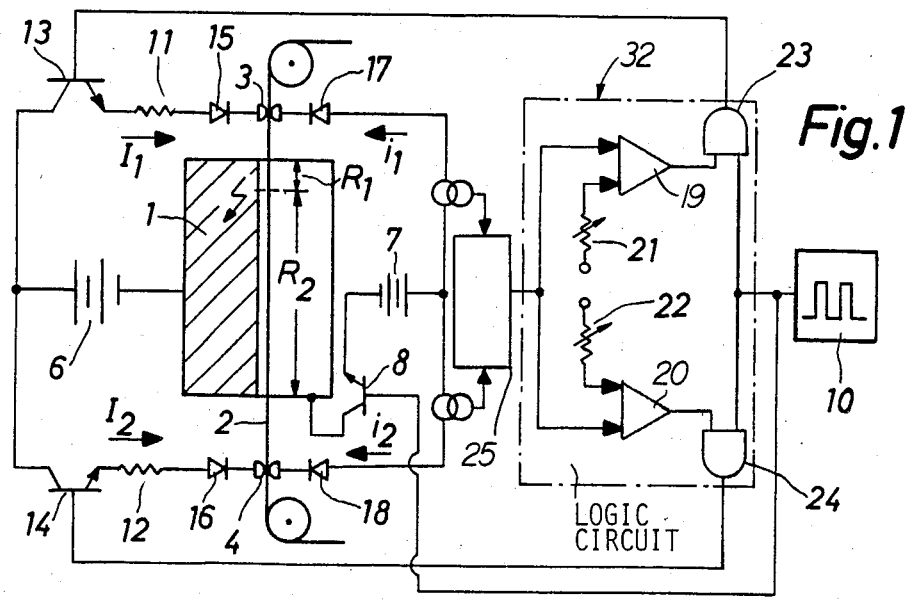
FIG. 1 schematically illustrates an example of circuitry according to the present invention.

FIG. 1 illustrates a travelling wire EDM apparatus wherein a workpiece 1 is cut by an electrode wire 2 displaced longitudinally between two wire guide members 3 and 4. A pulse generator is made of two circuits, one provided with a current power supply 6 and the other with a current power supply 7, both connected across the workpiece 1 and the contacts supplying current to the electrode wire 2. In the drawing, the electrical contacts are represented by the wire guide members 3 and 4 in order to simplify the drawing. The circuit of the first power supply 7 has a transistor switch 8 controlled by a frequency generator 10, and is arranged to trigger electrical discharges of low current.

The second current power supply 6 is arranged such as to transform the electrical discharge triggered by the first power supply into a power electrical discharge carrying the machining current. The second power supply 6 is connected to the wire contact guide member 3 through a transistor switch 13 and to the wire contact guide member 4 through a transistor switch 14. Such an arrangement permits to supply machining electrical discharges to the machining zone via one of the ends of the wire 1 when only the switch 13 is closed or via its other end when only the switch 14 is closed. When the two switches 13 and 14 are closed, machining current is supplied to the machining zone from both ends of the wire 2. The current in the first circuit branch is represented by $I_1$ and in the second branch is represented by $I_2$, and the impedance of each branch is represented by resistances 11 and 12 respectively. Appropriate diodes 15 and 16 are connected in the branches of the high power circuit. Opposite diodes 17 and 18 are connected in the branches of the lower power circuit, the diodes 15 and 17, and 16 and 18, respectively, having opposite polarity such as to block the passage of current from one of the circuits into the other.

The position of each electrical discharge along the machining zone is detected by a logic circuit 32 when the low power electrical discharge is triggered by measuring the current $i_1$ and $i_2$ circulating in the branches of the low power circuit provided with the power supply 7 and in processing the value of the currents in an appropriate circuit 25, for example, by calculating the differences between those currents as described in detail in U.S. Pat. No. 4,329,558, assigned to the same assignee as the present application. The sign of the difference between the two currents $i_1$ and $i_2$ indicates the half of the machining zone in which the electrical discharge takes place, and the value of the difference indicates the position of the electrical discharge. The difference between $i_1$ and $i_2$ is compared in a first comparator 19 to a first reference value represented by an adjustable resistor 21, and in a second comparator 20 to a second reference value represented by an adjustable resistor 22, the reference values representing respectively a first reference position and a second reference position of the electrical discharge in the machining zone. In the event that the electrical discharge appears between one of the ends of the machining zone and a first reference position, the comparator 19 provides at its output a signal applied to an input of an AND gate 23 for supplying a timing signal applied to the base of the transistor switch 13, such as to close the switch 13, as long as an enabling signal is applied by the frequency generator, or clock, 10 to the other input of the AND gate 23. The same signal, at the output of the pulse generator or clock 10, is used for turning on the switch 8 of the low power circuit providing the low power electrical discharges from which the position of that low power electrical discharge has been determined. In a similar manner, the switch 14 is closed when a signal appears at the output of the comparator 20 in coincidence with an enabling signal appearing at the output of the frequency generator or clock 10 to enable the AND gate 24, in the event that the electrical discharge is produced between the other and of the machining zone and the second reference position. In the event that the low power electrical discharge occurs between the two reference positions, both switches 13 and 14 are simultaneously closed.

Figure 2:
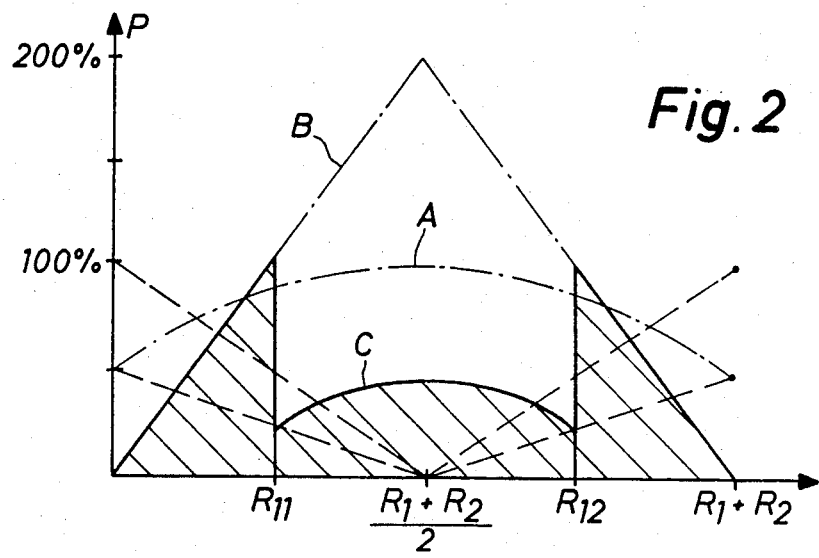
FIG. 2 is a diagram of the heat generated along an electrode wire with the arrangement of FIG. 1.

FIG. 2 diagrammatically illustrates the heat energy dissipated by the electrode wire, when the flow of current through the machining zone is accomplished in a selective manner, according to the invention. $R_{11}$ and $R_{12}$ represent the first and second reference positions determined by the adjustable resistors 21 and 22 of FIG. 1. The position of an electrical discharge is represented in ordinate by the resistance $R_1$ of the wire between one end of the machining zone and the position of electrical discharge, the resistance of the wire between the position of the same electrical discharge and the other end of the machining zone being represented by $R_2$. The relative energy or power P dissipated by the wire varies according to a function represented by curve A if current is supplied from both ends of the machining zone, being maximum at the middle of the machining zone and minimum at each end. If current is supplied from a single end of the machining zone, the power dissipated by the wire is a linear function, as represented by curve B, up to the middle of the machining zone.

Figure 3:
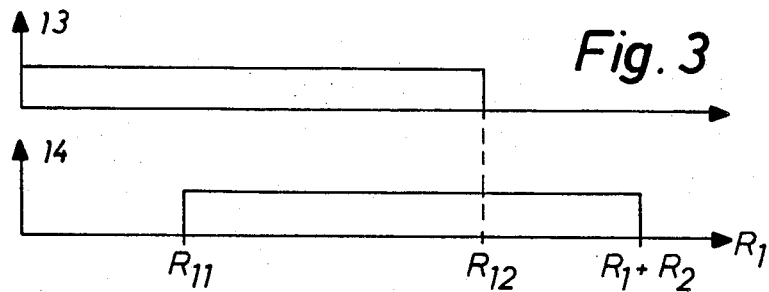
FIG. 3 is a timing diagram of the opening and closing of switches relative to the timing of electrical discharges.

When the current supply to the wire is effected, according to the invention, in a selective manner relative to the position of the electrical discharge, as illustrated in the timing diagram of FIG. 3, the switch 14 is open as long as the electrical discharge appears between one end of the machining zone and the first reference position and closed from that first position on. The second switch 13 is closed up to the second position and open between that position and the other end of the machining zone.

The number of electrical discharges produced during a predetermined time period is the same in all the portions of the machining zone, but the power dissipated along the wire, which is proportional to the number of electrical discharges, is effected along the portion of the linear curve B when a single switch provides current to the machining zone, but is no longer according to the curve A when both switches are closed, between $R_{11}$ and $R_{12}$. In effect, each time an electrical discharge is produced in one or the other of the two extreme zones limited respectively by $R_{11}$ and $R_{12}$, no current flows through the middle zone such that the power dissipated in the middle zone during the same period of time is decreased proportionally to the length $R_{11}$-$R_{12}$ of the middle zone, such that the curve A becomes a curve C whose value is reduced in the same proportions. The total power dissipated by the wire during that period of time is represented by the areas bordered by the portion of the line B in the end zones and the curve C in the middle zone. It is readily apparent from the example of operation diagramatically illustrated at FIG. 2 that, in the end portions of the machining zone which are best cooled by the machining fluid, the energy dissipated is not substantially reduced. However, in the middle portion, where cooling is substantially reduced, there is a substantial reduction of the power being dissipated. The opposite takes place if the reference positions $R_{11}$ and $R_{12}$ are displaced toward the ends of the machining zone.

Figure 4:
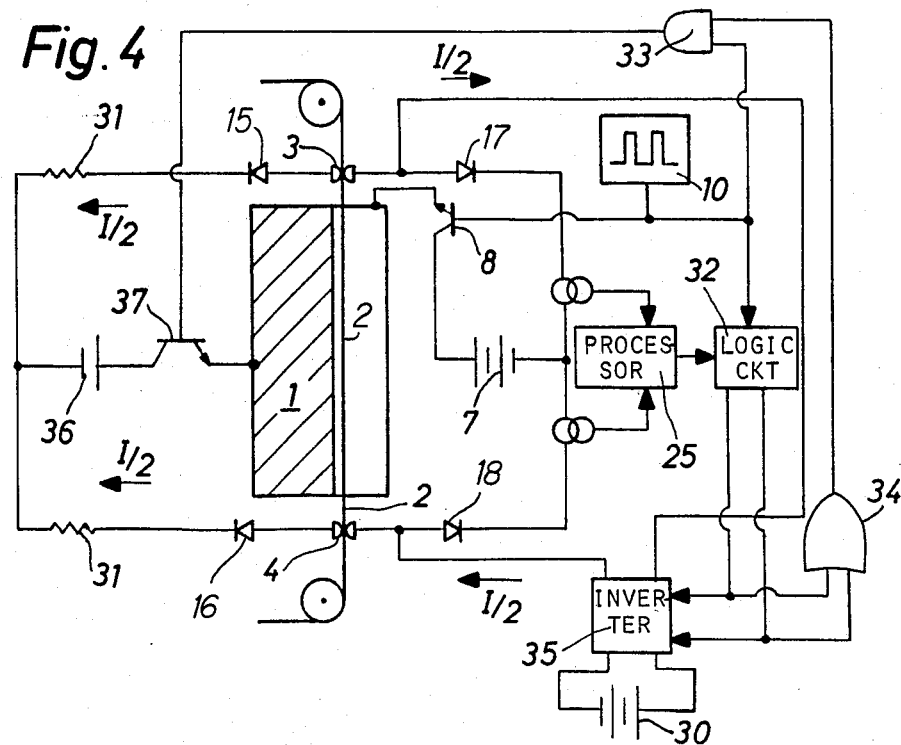
FIGS. 4–6 and 8 are schematic representations of further examples of circuitry for practicing the invention.

FIG. 4 illustrates another arrangement for practicing the invention wherein the current power supply 6 of FIG. 1 is replaced by a voltage power supply 36 and wherein current limiting resistors 31 are provided in the circuit, the resistors 31 having each a resistance much higher than the total resistance of the wire such as to pass one half of the machining current through each branch of the circuit, irrespective of the position of the electrical discharge along the wire. In the arrangement of FIG. 4, the selective effect of the switches of FIG. 1 is obtained by an auxiliary circuit supplied by a current power supply 30 which supplies along the wire 1 a current equal to one-half the machining current such as to reduce to zero the current in a portion of the wire. The circuit of FIG. 4 comprises an inverter 35 which permits to choose the end of the machining zone at which the current is supplied. The inverter 35 is controlled by a logic circuit 32 identical to the logic circuit 32 of FIG. 1. The operation of the switch 37 of the high power circuit is timed by the clock 10 through an AND gate 33 which passes a control signal from an OR gate 34 when a selection signal is provided by the logic circuit 32.

Figure 5:
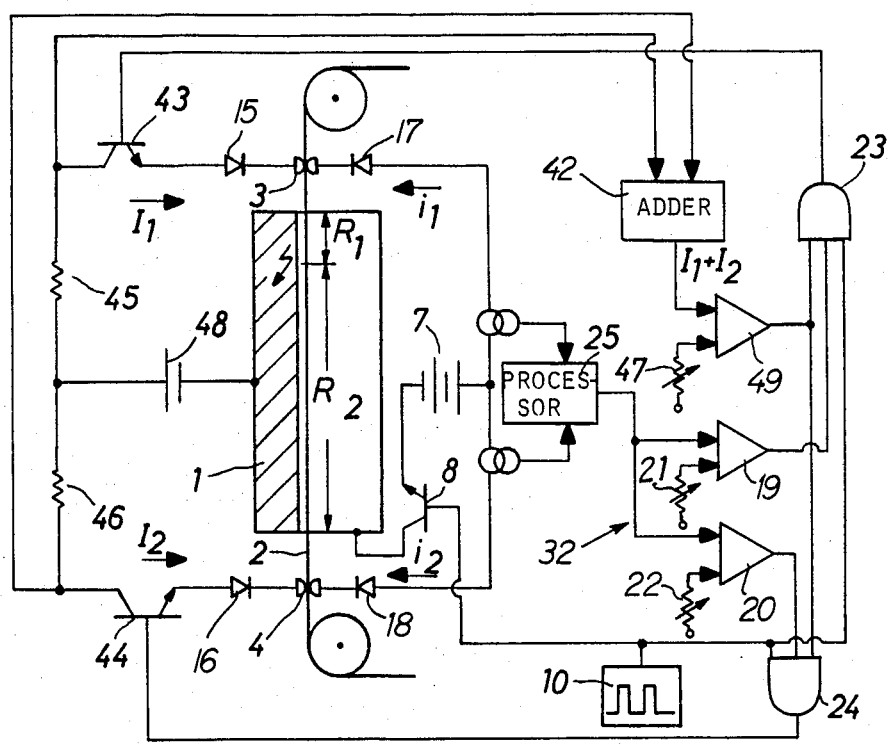

FIG. 5 illustrates another modification of the invention which comprises a low power electrical discharge triggering circuit, including the low power power supply with detection of the position of the electrical discharge identical to that of FIG. 1 and a voltage power supply 48 connected to each side of the machining zone through respectively the switch 43 and the switch 44. The selection of the ends through which current is supplied is obtained in the same manner as previously described, however each switch 43 and 44 has an additional function consisting in maintaining the electrical discharge current constant irrespective of the position of the electrical discharge along the machining zone. Absent such a feature, the electrical discharge current varies if the voltage power supply 48 is connected to the wire 2 through different branches whose impedance is of the same order of magnitude than the impedance of the wire. Under such conditions, the currents $I_1$ and $I_2$ supplied to the machining zone are respectively measured by the shunt resistors 45 and 46 and added in an adder 42. The difference between the sum of the currents and a reference 47 as compared in a comparator 49 is amplified by an adjusting circuit such as to maintain the electrical discharge average current at a value corresponding to the reference through a high frequency oscillation of each of the switches produced during each current pulse.

Figure 6:
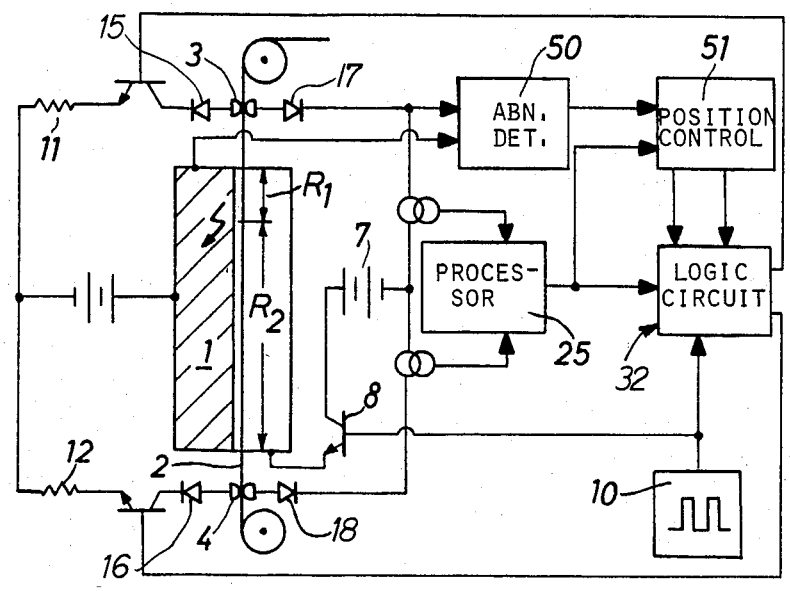

FIG. 6 illustrates an embodiment of the invention permitting to eliminate some of the thermal stresses imposed upon the electrode wire. The difference between the schematic of FIG. 6 and that of FIG. 1 is that the position references are modified automatically as a function of the position in the machining zone where electrical discharges are occurring in a disorganized manner, for example due to a high repetition rate of short circuits. In order to detect the position in the machining zone where some disturbance takes place, a circuit 50 provides a signal indicating electrical discharge disturbance and the signal provided by the processor circuit 25 is an indication of the location of the disturbance. Thus signals are applied to a position control circuit 51 which varies the reference values such as to maintain the zone of disturbance between the two reference values.

Figure 7:
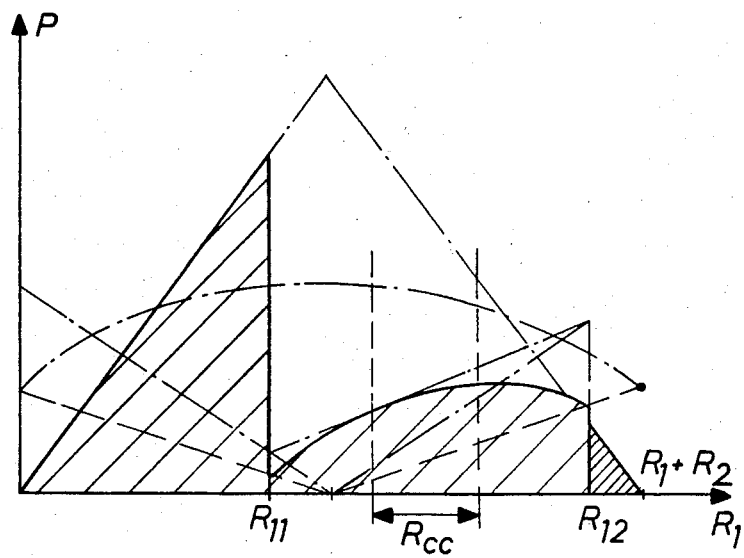
FIG. 7 is a diagram of heat generation along an electrode wire resulting from the operation of the circuit of FIG. 6.

FIG. 7 is a diagram illustrating what takes place when disturbance is detected in a zone $R_{cc}$ having caused a corresponding displacement of the reference value $R_{11}$ and $R_{12}$. In this manner the zone of disturbance $R_{cc}$ is located at a position of the machining zone where the power dissipated is the lowest, which permits to prevent excessive thermal stresses to be imposed upon the wire and to avoid any risk of rupture of the wire.

Figure 8:
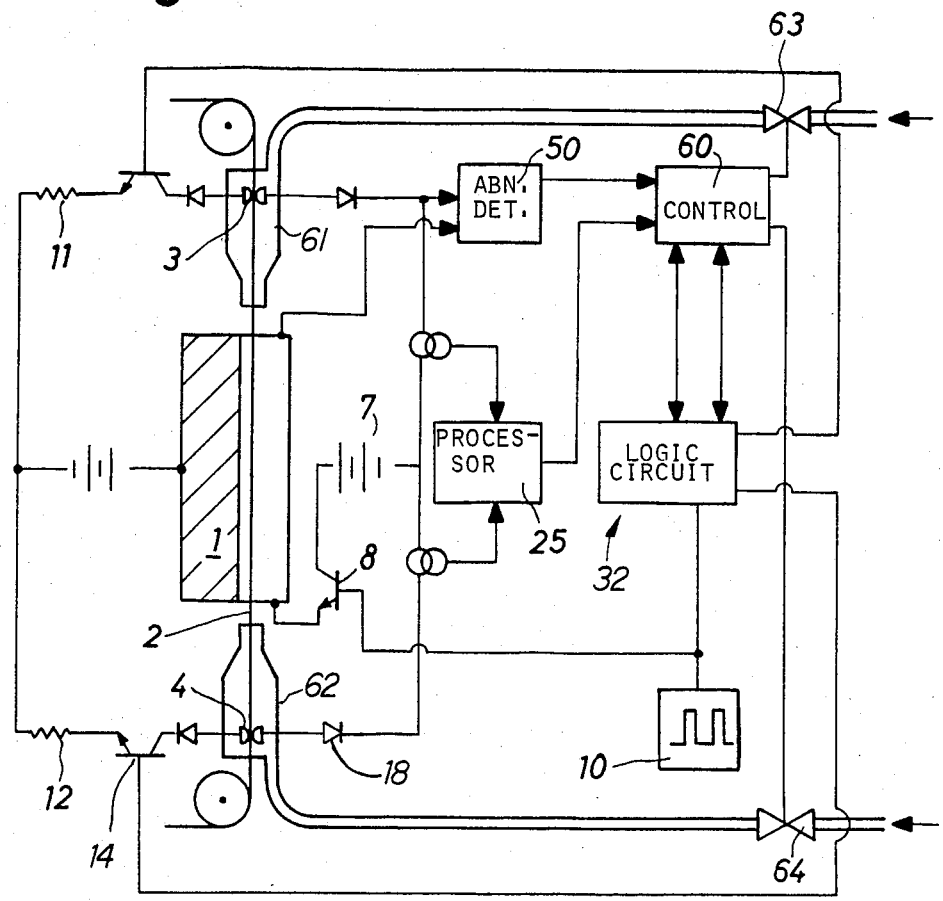

FIG. 8 illustrates another embodiment of the invention permitting to avoid excessive thermal stresses being exerted on the wire at the location of short circuits. The arrangement of FIG. 8 comprises the same element as illustrated at FIG. 6, but, in the arrangement of FIG. 8, a machining parameter, for example the pressure of the machining fluid flowing through nozzles 61 and 62 into the machining zone, is adjusted by means of a control circuit 60 providing two output signals controlling respectively flow valve 63 and flow valve 64, in turn controlling the pressure of the machining fluid injected in each end of the machining zone by respectively nozzles 61 and 62.

Having thus described the invention, modifications whereof will be apparent to those skilled in the art, what is claimed as new is as follows:

1. A method for effecting a cut in an electrically conductive workpiece by electrical discharges in a machining zone between said workpiece and an electrode wire in a travelling wire EDM apparatus wherein machining current is supplied to the wire at each one of the ends of said machining zone between said wire and said workpiece, said method comprising detecting the position of the electrical discharges occurring in said machining zone, and controlling by circuit means the supply of the machining current through one or the other end of the machining zone as a function of the position where an electrical discharge is detected.

2. The method of claim 1 therein the machining current is supplied to one end of the machining zone when the detected position of an electrical discharge is situated between said end and a first reference position, the machining current is supplied to the other end of the machining zone when the detected position of an electrical discharge is situated between said other end and a second reference position, and the machining current is supplied simultaneously to both ends of the machining zone when the detected position of an electrical discharge is situated between said reference positions.

3. The method of claim 2 wherein machining fluid is supplied under pressure at each end of said machining zone and wherein a position of electrical discharge disturbance is detected, comprising varying the pressure of the machining fluid such as to displace between said reference positions the location where said machining disturbance appears.

4. The method of claim 2 wherein a position of electrical discharge disturbance is detected, and at least one of said reference positions is displaced such that said position of electrical discharge disturbance is between said reference positions.

5. The method of claim 1 wherein machining fluid is supplied under pressure at each end of the machining zone and wherein a position of electrical discharge disturbance is detected, comprising varying the pressure of the machining fluid such as to displace between said reference positions the location where said electrical discharge disturbance appears.

6. In a travelling wire EDM apparatus wherein an electrically conductive workpiece is cut by electrical discharges by means of an electrode wire, and wherein machining current is supplied to the wire at either end of a machining zone formed between said wire and said workpiece, the improvement comprising a machining pulse power generator, a pair of contacts in engagement with said wire and disposed one at one end of said machining zone and the other at the other end of said machining zone, means connecting a terminal of said power generator to the workpiece, means connecting the other terminal of said power generator by parallel connections to each one of said contacts, means providing an indication of the position of each electrical discharge along the machining zone, a logic circuit cooperating with said means providing an indication of the position of each electrical discharge, first switching means between said power generator and one of said contacts, second switching means between said power generator and the other of said contacts, and means controlled by said logic circuit for turning on one of said switching means or the other as a function of the position of said electrical discharge along said machining zone relative to reference positions and for turning on both switching means upon detecting a position for said electrical discharge between said reference positions.

7. The improvement of claim 6 wherein machining fluid is injected under pressure in each end of the machining zone, comprising means detecting electrical discharge disturbance, and control means adjusting the pressure of machining fluid injected in each end of the machining zone as a function of the position where said electrical discharge disturbance is detected.

8. The improvement of claim 6 wherein an auxiliary current generator is connected across said contacts through a polarity inverter controlled by said logic circuit.

9. The improvement of claim 6 wherein switching means are provided for maintaining constant the current flowing through one or the other, or both of said contacts.

10. The improvement of claim 6 comprising means detecting electrical discharge disturbance, and control means for adjusting at least one of the reference positions for positioning the electrical discharge disturbance between said reference positions.

* * * * *

UNITED STATES PATENT AND TRADEMARK OFFICE
CERTIFICATE OF CORRECTION

PATENT NO. : 4,652,717  Page 1 of 3
DATED : March 24, 1987
INVENTOR(S) : Jean P. Briffod et al It is certified that error appears in the above-identified patent and that said Letters Patent is hereby corrected as shown below:

Column 1, line 25, delete "from" and insert --on--;

line 48, after "for", insert --its--;

lines 51-52, delete "permits to prevent" and insert --prevents--;

line 53, delete "to take place" and insert --from occurring--;

line 55, delete "to select" and insert --selection of--.

Column 2, line 39, delete "permits to supply" and insert --supplies--.

Column 4, line 25, before "having", insert --each--;

Column 4, line 25, after "having" delete "each";

line 36, delete "to choose" and insert --a choice of--.

UNITED STATES PATENT AND TRADEMARK OFFICE
CERTIFICATE OF CORRECTION

PATENT NO. : 4,652,717

DATED : March 24, 1987

INVENTOR(S) : Jean P. Briffod et al

It is certified that error appears in the above-identified patent and that said Letters Patent is hereby corrected as shown below:

Column 5, line 4, delete "to eliminate" and insert --elimination of--;

line 26, delete "permits to prevent" and insert --prevents--;

line 28, delete "to avoid" and insert --avoids--;

line 31, delete "to avoid" and insert --avoidance of--; same line, after "stresses" insert --from--;

line 41, delete "respectively" and insert --respective--;

line 44, delete "whereof" and insert --thereof--;

UNITED STATES PATENT AND TRADEMARK OFFICE
CERTIFICATE OF CORRECTION

PATENT NO. : 4,652,717

DATED : March 24, 1987

INVENTOR(S) : Jean P. Briffod et al

It is certified that error appears in the above-identified patent and that said Letters Patent are hereby corrected as shown below:

Column 5, line 59, delete "therein" and insert --wherein--.

Signed and Sealed this

Eleventh Day of August, 1987

Attest:

DONALD J. QUIGG

*Attesting Officer*   *Commissioner of Patents and Trademarks*